United States Patent [19]

Shiiki et al.

[11] Patent Number: 4,907,114

[45] Date of Patent: Mar. 6, 1990

[54] MANGETO-RESISTIVE TYPE READ HEAD

[75] Inventors: Kazuo Shiiki, Tsukui; Masahiro Kitada, Nishitama; Hideo Tanabe, Higashimurayama; Hitoshi Nakamura, Hachioji; Isamu Yuito, Hachioji; Hisashi Takano, Hachioji, all of Japan

[73] Assignee: Hitachi, Ltd., Tokyo, Japan

[21] Appl. No.: 201,739

[22] Filed: Jun. 3, 1988

[30] Foreign Application Priority Data

Jun. 5, 1987 [JP] Japan .................................. 62-139725

[51] Int. Cl.⁴ ............................................... G11B 5/30
[52] U.S. Cl. ..................................................... 360/113
[58] Field of Search ........................................... 360/113

[56] References Cited

FOREIGN PATENT DOCUMENTS 0216062 4/1987 European Pat. Off. ............ 360/113

Primary Examiner—A. J. Heinz
Attorney, Agent, or Firm—Fay, Sharpe, Beall, Fagan, Minnich & McKee

[57] ABSTRACT

A magneto-resistive type read head has a substrate, a magnetic film exhibiting a magneto-resistive effect arranged in the widthwise direction of the track of a magnetic writing disk, and lead electrodes for feeding an electric current to the track width portion of the magnetic film for reading the signals written in the magnetic writing disk. The magneto-resistive film extends over a width wider than the track width portion and a soft magnetic thin film is formed over the magneto-resistive film on either side of the track width portion to absorb the domain wall so that the magneto-resistive film takes the single domain structure.

6 Claims, 1 Drawing Sheet

MANGETO-RESISTIVE TYPE READ HEAD

BACKGROUND OF THE INVENTION

The present invention relates to a magnetic head for detecting the signal magnetization recorded in a magnetic recording medium by making use of the magneto-resistive effect and, more particularly, to a magnetic disk drive thin film head for reading the signals recorded in a high track density, efficiently with low noises.

The magnetic disk drive head of the prior art has been used as a self read-write head for reading and writing operations with a common head. In order to satisfy the demand for improved linear density and higher performance magnetic head, it is necessary to make independent and optimize the write head and the read head. This concept of separate write and read heads has already been well known in the audio tape or the magnetic filing tape (MT) system of the prior art. Since each of these has a track width of several hundreds of microns or more, the format cannot be used for a magnetic disk drive.

An example of a head suitable for a high efficiency read operation that uses magneto-resistance is disclosed in Japanese Patent Laid-Open No. 101411/1978.

The magneto-resistive type head cannot be used with magnetic tapes of the prior art because of large read output fluctuations that occur when the track width is reduced. This problem arises for the following reason: As the track width of magneto-resistive magnetic film is reduced, its magnetic domain does not become single but establishes a domain wall having no reproductivity so that the so-called "Barkhausen noises" are generated.

SUMMARY OF THE INVENTION

An object of the present invention is to provide a magneto-resistive type read head which has few output fluctuations (or Barkhausen noises) even with a narrow track width of several tens of microns or less.

The above-specified object can be achieved by not patterning a magneto-resistive magnetic film to have a small track width of several tens of microns or less but keeping the same length as within such a range as to generate no Barkhausen noises and by forming a soft magnetic thin film (which may be made of the same material as that of the magneto-resistive magnetic film) thick over the portion of the magneto-resistive magnetic film other than a signal reading portion.

Since the portion formed thick of the soft magnetic thin film acts to suppress generation of any unnecessary domain wall and has a high diamagnetism but a remarkably low read efficiency of the signals, the signals can be read exclusively at the narrow track portion.

DETAILED DESCRIPTION OF THE PREFERRED EMBODIMENT

Figure 1A:
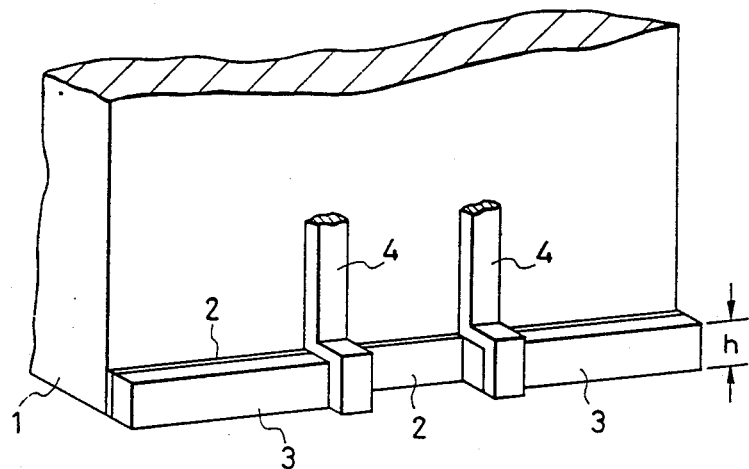
FIG. 1A is a schematic perpective view showing a magneto-resistive type read head according to one embodiment of the present invention.

The present invention will be described in the following in connection with one embodiment thereof with reference to FIGS. 1A and 1B. Reference numeral 1 designates a substrate which was prepared by sputtering $Al_2O_3$ having a thickness of about 50 $\mu$m over a sintered material of $Al_2O_3$—TiC having a thickness of 4 mm and a diameter of 3 inches and by polishing the sputtered sintered material flat. A practical head comprises a soft magnetic thin film of about 1 $\mu$m or more as a shielding material. Although not shown because of a lack of direct relation to the present invention, in the present embodiment, an alloy of Ni-Fe (19 wt%) having a thickness of about 1 $\mu$m was formed over the substrate by the evaporation method, and an insulator of $Al_2O_3$ having a thickness of 0.5 $\mu$m was formed by the sputtering method. An alloy of Ni-Fe (19 wt%) having a thickness of about 400 Å was evaporated thereover as a magneto-resistive film 2. With a view to improving the sensitivity of the magneto-resistance and to reduce the wave distortion, a bias field is usually applied in the magneto-resistive type head. In the present embodiment, a Ti film having a thickness of about 600 Å was simultaneously formed under the magneto-resistive film. Reference numeral 3 designates a soft magnetic thin film which was prepared by forming thereover an alloy of Ni-Fe (19 wt%) having a thickness of about 1 $\mu$m and by forming a laminated pattern of Ti of about 0.1 $\mu$m and Au of 1 $\mu$m as lead electrodes 4. In the practical head, an insulator of $Al_2O_3$ having a thickness of 0.5 $\mu$m was formed thereover by the sputtering method, and an alloy of Ni-Fe (19 wt%) having a thickness of about 1 $\mu$m was formed as a shielding material by the evaporation, although not shown. Incidentally, the material for the substrate may be any one currently used as a head such as AlN or SiC, and the shielding material may be a soft magnetic thin one such as Mn-Zn ferrite or an amorphous alloy of CoNbZr. The shunt film may be made of Mo, Zr, Nb or Ta in addition to Ti. The magneto-resistive film to be used can naturally be made of a ferromagnetic material having a high magento-resistance. In addition, the insulating material may be a currently used one such as $SiO_2$ in addition to $Al_2O_3$, and the electrode material may be an alloy of NiFe, Cu or its alloy, another intermetallic compound or its multi-layer composite material in addition to the multi-layer film of Ti/Au. A well-known method of a soft bias, permanent bias or barberpole type can be applied as the biasing method.

It is desired from the point of the reaction or the like in the process that the soft magnetic thin film 3 be made of the Ni-Fe alloy like the magneto-resistive film. However, the soft magnetic thin film 3 can be made of an amorphous soft magnetic alloy having a coercive force as low as several Oe or less such as CoNbZr or CoTaZr. In case a different material is used, an interlayer of Cr may be thinned as a barrier to 100 Å. The effective thickness of the soft magnetic thin film may be equal to that of the magneto-resistive film but the film can be made about ten times or more thinner for higher effects. In the present embodiment: the width A of a track portion for reading signals is about 10 $\mu$m; the whole length B of the magneto-resistive film is 120 $\mu$m; and the height h of the magneto-resistive film is about 5 $\mu$m. Since the domain wall is liable to occur from the end portion, generally speaking, the whole length B is desired to be ten times or more as large as the height h so as to eliminate the influences of the domain wall and consider the influences of a diamagnetic field. In order that the magnetic field established by magnetizing the signals recorded in the disk may be effectively applied to all over the height of the magneto-resistive film, it is desirable that the height h be equal to or less than the track width. It is therefore usual that the whole length B is ten times as large as the track width.

Figure 2A:
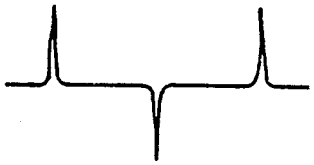
FIG. 2A is a chart illustrating the operating waveform of the embodiment of the present invention.

FIG. 2A illustrates a waveform when signals having a writing density of 1 kFCI are written in a coated disk of Co-$\gamma$Fe$_2$O$_3$ having a coercive force of 600 Oe by a Mn-Zn ferrite head and read by a magneto-resistive type head.

In the structure of the present invention, the soft magnetic thin film 3 is liable to absorb the domain wall of the magneto-resistive film 2 so that the magneto-resistive film takes the single domain structure. As a result, no Barkhausen noises are generated to stabilize the output, as shown in FIG. 2A.

Figure 1B:
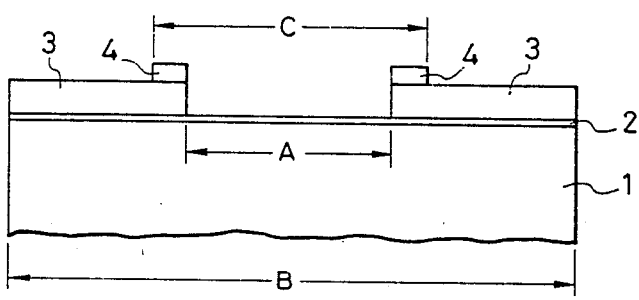
FIG. 1B is a top plan view showing the side of the head according to FIG. 1A that faces the recording medium.
Figure 2B:
FIG. 2B is a chart illustrating the operating waveform of one example of the prior art.

In the magneto-resistive type head having the structure of the prior art, i.e., in the head in which the soft magnetic thin film 3 is not formed so that the whole length of the magneto-resistive film is substantially equal to the inter-electrode distance C of FIG. 1B, read output fluctuations as high as about 20 % are caused, as illustrated in FIG. 2B. Moreover, the noises are 1.5 times as high as those of the head of the present invention. This means that the effects of the present invention are prominent.

In the magneto-resistive type head, according to the present invention, since the Barkhausen noises can be reduced, the efficient read of the signals is possible. High effects can be expected as for the read head even when the track width is about 20 $\mu$m or less. Here, the present invention is characterized in that the portion of a thin magnetoresistive film other than the track width is magnetically short-circuited through the thick soft magnetic film. This character can naturally be combined with the technique known by the related art.

For example, the magneto-resistive type head can be of the so-called "differential type", in which another electrode is provided at the center of the track, as used in the magnetic tape system, to differentially detect the signals to reduce the noises and the harmonic distortion.

What is claimed is:

1. A magneto-resistive type read head, comprising:
 a substrate;
 a magnetic film having a magneto-resistive effect and arranged in the widthwise direction of a track of a magnetic writing disk; and lead electrodes for feeding an electric current to a track width portion of said magnetic film for reading the signals written in said magnetic writing disk, said magnetic film extending over a width larger than said track width portion; and
 a second soft magnetic thin film formed in contact with said magnetic film on at least that side of the portion of said magnetic film other than said track width portion which faces said magnetic writing disk.

2. A magneto-resistive type read head according to claim 1, wherein said magnetic film has a length at least ten times as large as its height.

3. A magneto-resistive type read head according to claim 1, wherein said second soft magnetic thin film is made of the same material as that of said magnetic film.

4. A magneto-resistive type read head according to claim 1, wherein said second soft magnetic thin film is at least ten times as thick as said magnetic film.

5. A magneto-resistive type read head according to claim 1, wherein at least that side of the portion other than the track width portion of said magnetic film which faces a magnetic writing disk is thicker than said track width portion.

6. A magneto-resistive type read head according to claim 5, wherein the magnetic film at the portion other than said track width portion is at least ten times as thick as said track width portion.

* * * * *